No. 897,591. PATENTED SEPT. 1, 1908.
J. W. COOPER.
AUTOMOBILE RUNNING GEAR.
APPLICATION FILED JULY 2, 1907.
4 SHEETS—SHEET 1.
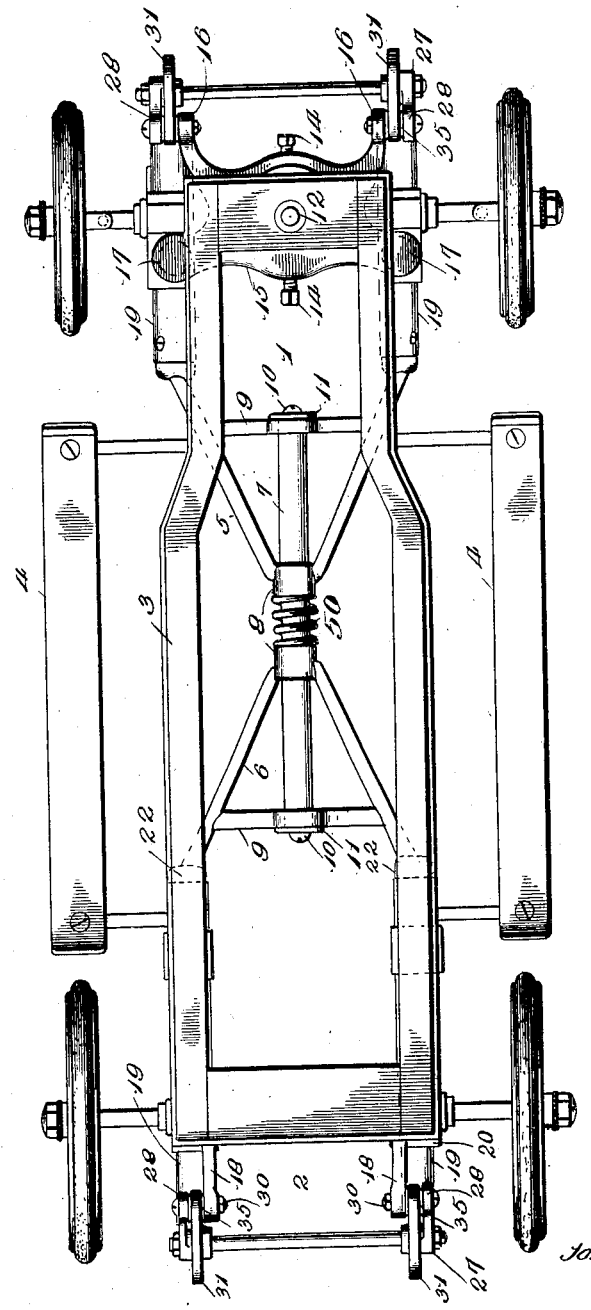

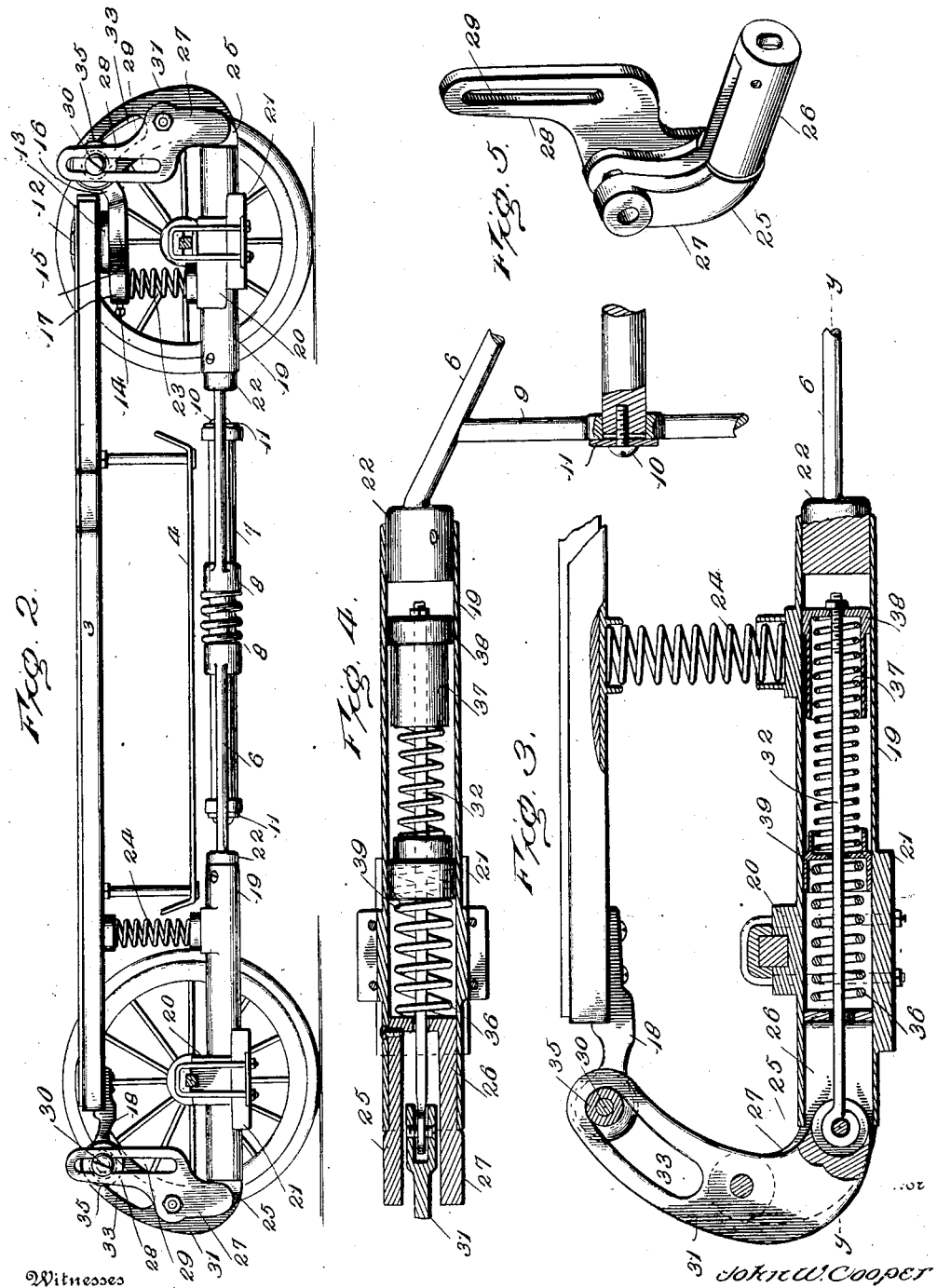

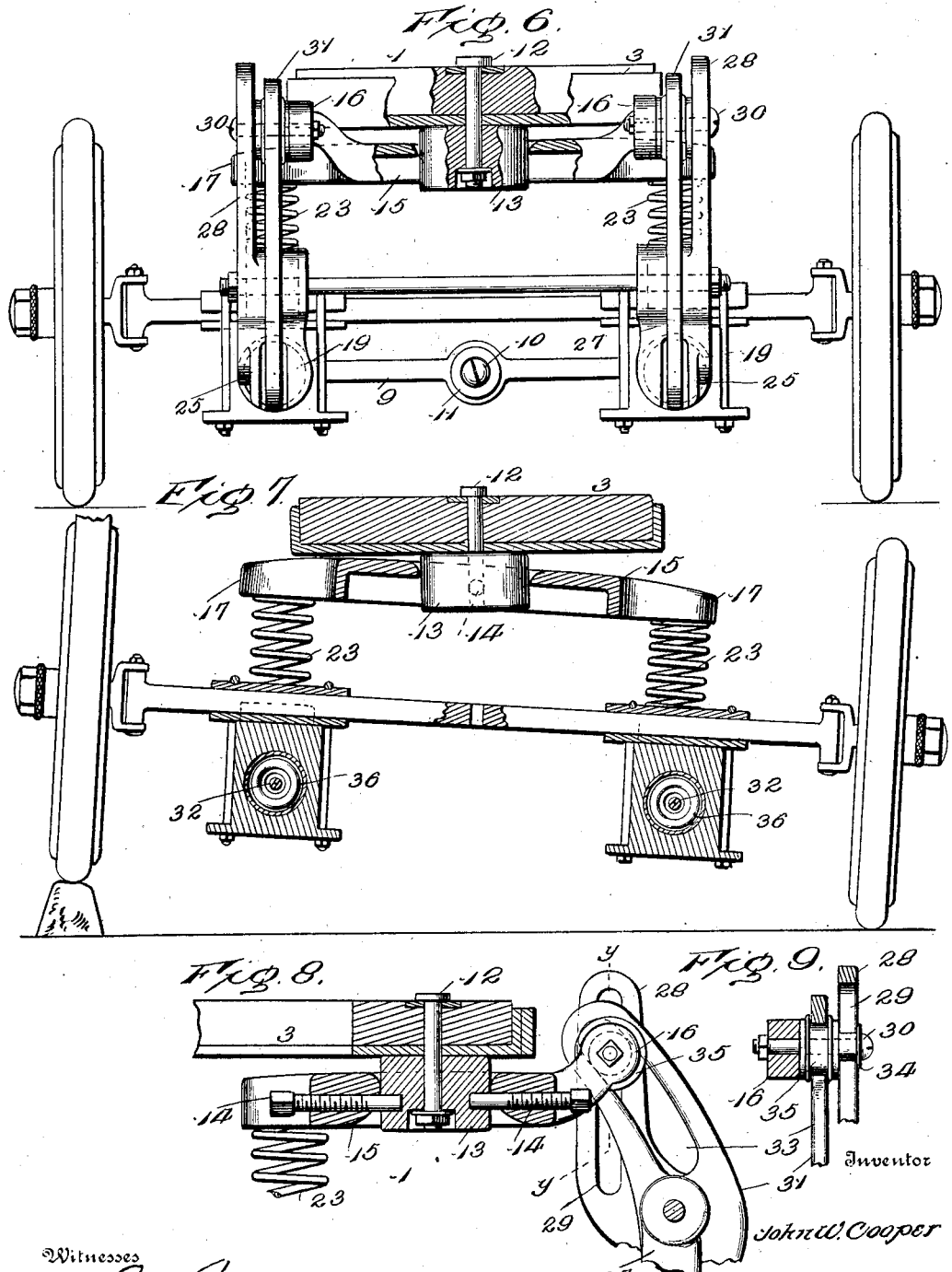

No. 897,591.
PATENTED SEPT. 1, 1908.
J. W. COOPER.
AUTOMOBILE RUNNING GEAR.
APPLICATION FILED JULY 2, 1907.
4 SHEETS—SHEET 4.
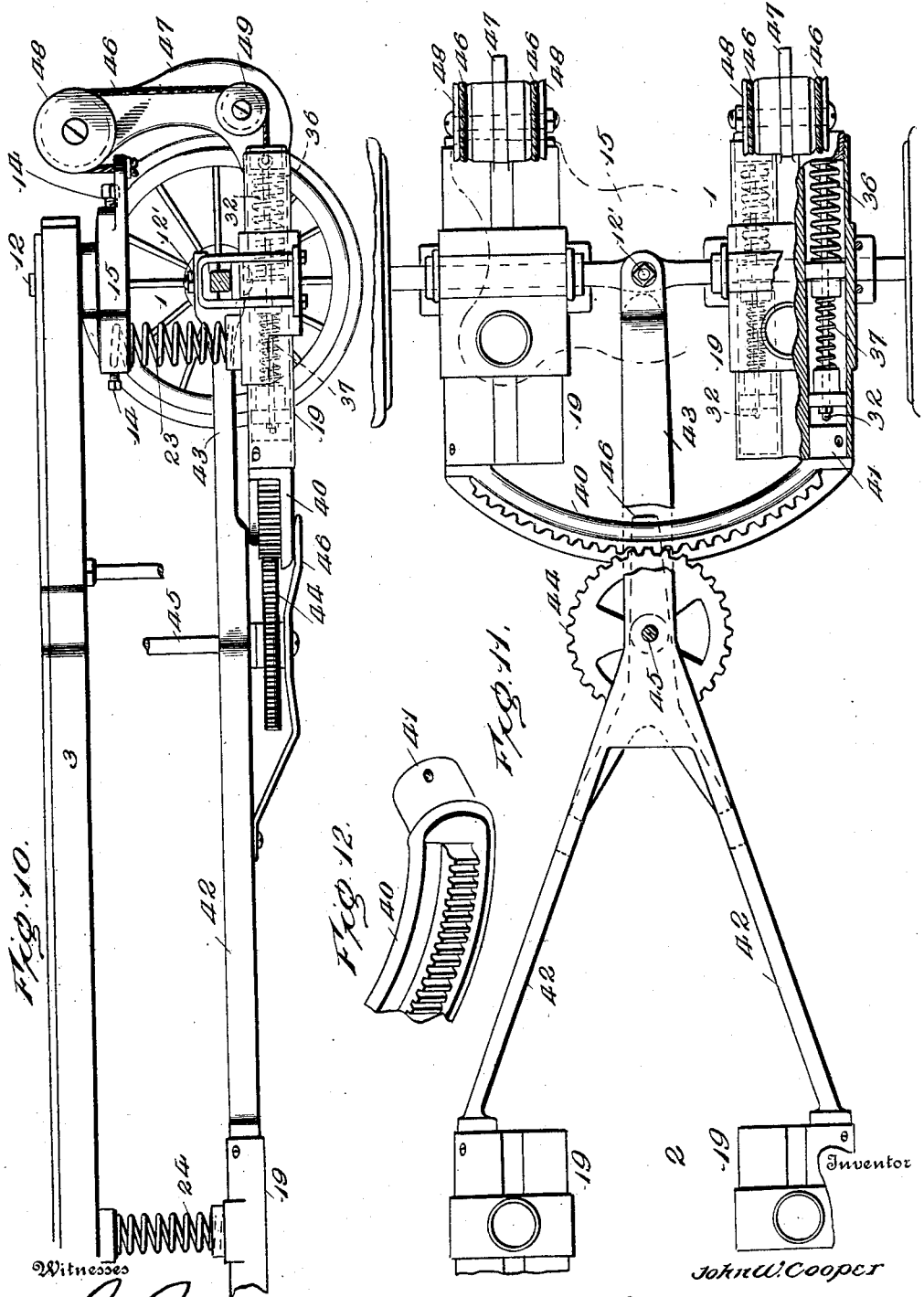
Witnesses
Inventor
John W. Cooper
By R. W. & P. Roey, Attorneys

UNITED STATES PATENT OFFICE.

JOHN W. COOPER, OF BOSTON, MASSACHUSETTS.

AUTOMOBILE RUNNING-GEAR.

No. 897,591.     Specification of Letters Patent.     Patented Sept. 1, 1908.

Application filed July 2, 1907. Serial No. 381,819.

*To all whom it may concern:*

Be it known that I, JOHN W. COOPER, citizen of the United States, residing at Boston, in the county of Suffolk and State of Massachusetts, have invented certain new and useful Improvements in Automobile Running-Gears, of which the following is a specification.

In the construction of mechanically propelled road vehicles, such as automobiles, it is desirable to secure ease and comfort by neutralizing shock and vibration, this being effected usually by yielding treads of the wheels and by interposed springs between the vehicle body or its supporting frame and the running gear.

By reason of the peculiar construction of the type of machines aforesaid, it has not been possible to obtain sufficient spring play between the running gear and vehicle body to take up jolt and jar, this being due to the small amount of play between the vehicle body and running gear.

This invention provides a construction in which the springs have a horizontal arrangement and movement, the body or body supporting frame being suspended and connected with said springs and otherwise mounted to secure ease and comfort.

A further purpose of the invention is to construct the springs so they will yield to a light or a heavy load, this being accomplished by having each spring of differential formation and consisting of a comparatively light spring and a stout or heavy spring, the light spring sustaining the shock of a small load and both springs acting jointly to ease the jar and vibration when the vehicle is heavily loaded.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of the running gear of a mechanically propelled vehicle or automobile embodying the invention. Fig. 2 is a side view of the running gear, the wheels on the inner side being omitted and their axles in section. Fig. 3 is a longitudinal section of a differential spring and its mountings, showing a portion of the body supporting frame and interposed connections. Fig. 4 is a horizontal section on the line $y$—$y$ of Fig. 3, showing a portion of the coupling and rear hounds. Fig. 5 is a detail perspective view of one of the supporting brackets between the upper and lower frames of the running gear. Fig 6 is an end view of the fore-gear, parts being broken away to show more clearly the king bolt connection between the upper and lower frames. Fig. 7 is a view similar to Fig. 6, having the supporting brackets and connections omitted and illustrating the relation of the parts when one of the wheels is passing over an obstruction. Fig. 8 is a detail view, showing the king bolt and swivel connection between the upper and lower frames, also the bracket and lever connection. Fig. 9 is a sectional view on the line $y$—$y$ of Fig. 8. Fig. 10 is a side view of the front portion of a modified form of running gear, the interposed levers being replaced by means of a cable and the fore-gear mounted to turn about the king bolt when it is required to steer the machine. Fig. 11 is a top plan view of the modified form of running gear shown in Fig. 10. Fig. 12 is a detail perspective view of an end portion of the curved rack bar, forming an element of the steering mechanism and having connection with the fore-gear.

Corresponding and like parts are referred to in the following description and indicated in all the views of the drawings by the same reference characters.

The fore-gear 1 and the hind-gear 2 may be of any construction depending upon the design, style and make of machine.

In the construction shown in Fig. 1 and the detail views thereof, the invention is adapted to the type of machine in which the front wheels are mounted upon spindles having pivotal connection with the ends of the axle.

In the construction shown in Figs. 10 and 11, the fore-gear is mounted to turn about a vertical axis, the front wheels being carried by spindles rigid with the axle. The upper or body supporting frame 3 may be of any form or construction, and, as shown consists of a combined metal and wooden frame, the metal frame being constructed of angle bars and the wooden frame being fitted and secured thereto. Steps or running boards 4 are provided at opposite sides of the running gear to admit of ingress and egress from the vehicle. The fore and hind gears are somewhat similar in construction and are coupled by means of front hounds 5, rear hounds 6 and a rod or shaft 7. The hounds 5 and 6 have their converged ends terminating in sleeves 8 through which the rod or shaft passes, and braces 9 connect the hounds near their diverged ends and are widened and apertured midway of their ends to receive the terminal portions of said rod or shaft, as indicated most clearly in Fig. 4. A set screw 10 threaded into each end of the rod or shaft 7 passes through a washer 11 placed against the outer side of the brace 9 and larger than the opening of the brace through which the end of the rod or shaft 7 passes. The hounds are adapted to turn upon the rod or shaft 7, thereby obviating torsional strain when the fore and hind gears are out of level, as when passing over unequal portions on the surface of a road. A swivel connection is provided between the upper or body supporting frame 3 and the fore-gear, the same consisting of a king bolt 12, block 13 and pivot screws 14, the latter being threaded into openings of a frame 15 which extends from one side of the running gear to the other and is provided with front extensions 16 and lateral extensions 17. The pivot screws 14 are located upon a longitudinal line, thereby admitting of the fore-gear rising or falling at either side according as one wheel may pass over an obstruction or drop into a rut. As indicated in Fig. 7, the left-hand wheel of the fore-gear is elevated, as when passing over a stone or other obstruction, the fore-gear turning upon the pivot screws 14 and upon the coupling rod or shaft 7, thereby permitting the upper or body supporting frame 3 to remain perfectly level. The king bolt 12 passes through the block 13 and the cross piece of the upper frame 3.

Bracket extensions 18 extend rearward from the frame 3 and their outer ends correspond with the outer ends of the front extensions 16, both sets of extensions being similarly connected to the frames of the fore and hind gears. The frames of the respective fore and hind gears are of similar or like construction and consist of tubes 19 shackled or otherwise connected to the axles so as to be rigid therewith. The tubes 19 are open throughout their length and are provided intermediate of their ends with upper and lower saddles 20 and 21 which receive the shackles, trips or other fastening means firmly connecting the tubes with the axles. The hounds terminate at their diverged ends with heads 22, which are inserted in the inner ends of the respective tubes 19 and are secured in place by suitable fastenings, said hounds in conjunction with the axles serving to connect opposite tubes of the respective gears. Springs 23 are interposed between the tubes of the fore-gear and the lateral extensions 17 of the frame 15, said springs being let into seats or depressions formed in the respective parts, thereby preventing displacement of the springs. Corresponding springs 24 are interposed between the tubes of the hind gear and the rear portion of the body supporting frame 3 and their end portions are fitted into depressions or seats provided upon the respective parts. Supporting brackets 25 are fitted into outer ends of the several tubes 19 and are secured in place therein.

The construction of the supporting brackets 25 is shown most clearly in Fig. 5. Each supporting bracket consists of a shank 26 adapted to fit snugly within the outer end of a tube 19, and an elbow 27 and a standard 28, the latter having a vertical slot 29 to receive the bolt or fastening 30 which connects the upper end of a lever 31 with one or the other of the extensions 18 or 16. The elbow 27 and outer portion of the shank 26 is slotted to receive the lower portion of the lever 31, and the inner end of the shank 26 is apertured to permit of the passage therethrough of the draft rod 32 which connects the lower end of the lever 31 with the load sustaining spring. The levers 31 are of elbow form and have pivotal connection with the upper arms of the elbows of the supporting brackets 25, the upper ends of said levers having a slot 33 through which the fastenings 30 pass and in which they play. A roller 34 is mounted upon the fastening 30 and operates in the slot 29 of the standard 28 so as to reduce the friction to the smallest amount possible. A curved wheel 35 likewise mounted upon the fastening 30 operates in the slot 33 of the lever 31 for a like purpose. The standards 28, in conjunction with the extensions 16 and 18, direct the body supporting frame 3 in its vertical movements and prevent vertical or lateral play thereof independent of the respective fore and hind gears.

The load sustaining springs, four in number, are arranged at the four corners of the running gear and are mounted in the respective tubes 19 so as to be housed and protected thereby. Each load sustaining spring comprises a heavy or stout spring 36 and a comparatively light spring 37, the two springs forming a load sustaining spring of differential or composite structure. The draft rod 32 passes through the springs 36 and 37 which are of the coil type. A cap 38 receives the inner or rear end of the spring, whereas the outer or front end of the spring bears against the shank 26 of the supporting bracket 25. A reducing cap 39 is interposed between the heavy spring 36 and the light spring 37 and centers the inner or opposing ends of said springs. When the vehicle mounted upon running gear equipped with the invention is loaded lightly, as by a single occupant, the weight is supported by the light springs 37, thereby affording ease and comfort which would not result if heavy or stout springs solely were used. As the load increases the light springs are proportionately compressed to a degree to overcome the tension of the heavy springs 36, the latter sustaining and carrying an excessive load, thereby relieving shock and jar and neutralizing vibration.

In the construction shown in Figs. 10 and 11, the fore-gear 1 is mounted to turn about the king bolt 12 as a vertical axis, the front hounds being replaced by means of a curved rack bar 40 provided at its ends with heads 41 corresponding to the heads 22 of the front hounds and insertible in and secured to the tubes inclosing the load sustaining springs. The rear hounds and coupling rod or shaft 7 are replaced by means of a reach, the same consisting of hounds 42 and a bar 43, the latter being pivotally connected to the fore-gear by means of the king bolt 12. The hounds 42 are provided at their rear ends with heads which are secured in the tubes of the hind-gear. A gear wheel 44 fast to a shaft 45 is in mesh with the teeth of the rack bar 40 and admits of steering the machine by means of suitable connections between the shaft 45 and any type of steering handle or device, not shown. The curved rack bar 40 bears against the underside of the bar 43 and its lower side is engaged by means of a confined stirrup or iron 46 secured to the hounds 42 of the reach or coupling. The lower end of the shaft 45 is mounted in or journaled to the stirrup or iron 46. The fore-gear is adapted to turn about the king bolt 12 and to oscillate on the pivot screws 14 in the manner hereinbefore stated, thereby permitting the body supporting frame to remain level even though the front and hind gears occupy different angular positions.

It is further contemplated to substitute different connecting means between the upper and lower frames for the levers 31, and as shown in Figs. 10 and 11, cables, ropes or like flexible connections 46 are provided, the same having their upper ends attached to the extensions of the upper frame and having their lower ends attached to the outer or front ends of the draft rods 32. The supporting brackets 47 are differently formed, comprising standards and shank portions, the latter being secured within the outer ends of the tubes and provided with direction pulleys 48 and 49 for the cables or flexible connections 46 to pass around. The springs arranged within the tubes 19 are substantially the same as hereinbefore described. Instead of single tubes at each side of a gear or truck, said tubes may be duplicated, as indicated in Fig. 11, and each provided with a load sustaining spring which is connected with the upper frame in the manner stated. The arrangement illustrated in Figs. 10 and 11 admits of the vehicle making a short turn, since the fore-gear or truck may be turned through the arc of about ninety degrees.

A spring 50 is interposed between the sleeves of the front and rear hounds and is mounted upon the coupling rod. This spring is of the coil type and is designed to relieve jar particularly when there is a tendency of the fore and hind gears to approach.

Having thus described the invention, what is claimed as new is:

1. In vehicle running gear, the combination of upper and lower frames, an intermediate frame between said upper and lower frames and having pivotal connection with the former, a vertical spring arranged between the inner portion of said intermediate frame and the lower frame, a horizontal spring mounted upon the lower frame and connecting means between said horizontal spring and the outer portion of the intermediate frame for supporting the latter by a suspending action.

2. In vehicle running gear, the combination of upper and lower frames, an intermediate frame arranged between the said upper and lower frames and having outer and inner extensions, and having connection with the said upper frame to turn about a vertical and a longitudinal axis, a vertical spring arranged between the inner extension of the intermediate frame and the lower frame, a horizontal spring mounted upon the lower frame, and a connection between said horizontal spring and the outer extension of the intermediate frame for sustaining the latter by a suspending action.

3. In a vehicle running gear, the combination of upper and lower frames, horizontal tubes secured to the lower frame and having outer extensions, vertical springs interposed between the inner ends of said horizontal tubes and the upper frame, springs arranged within the said tubes, and connecting means between the springs within the tubes and the upper frame and having connection with the outer extensions of said tubes.

4. In a vehicle running gear, the combination of upper and lower frames, horizontal tubes secured to the lower frame and having outer extensions, vertical springs interposed between the inner ends of said horizontal tubes and the upper frame, springs arranged within the said tubes, and levers pivoted between their ends to the outer extensions of the tubes and having connection at their lower ends with the springs within said tubes and at their upper ends with the upper frame.

5. In a vehicle running gear, the combination of upper and lower frames, horizontal tubes secured to the lower frame and having outer extensions, vertical springs interposed between the inner ends of said horizontal tubes and the upper frame, springs arranged within the said tubes, levers pivoted to the outer extensions of the tubes and having their upper ends slotted and their lower ends connected with the springs within the said tubes, and connecting means between the upper frame and the slotted ends of the levers and having limited play in the slots thereof.

6. In vehicle running gear, the combination of upper and lower frames, load sustaining springs arranged horizontally upon one of the frames, each of said springs consisting of a heavy coil spring and a light coil spring having an axial arrangement, draft rods passed axially through the heavy and light coil springs, a cap mounted upon the end of each draft rod to receive the outer end of the light spring, a reduced cap mounted upon said draft rod and arranged between the heavy and light springs to receive the inner or opposing ends thereof, and connecting means between the draft rods and the other frame.

7. In combination, a lower frame, brackets projected vertically from the lower frame and having their upper portions vertically slotted, an upper movable frame, connecting means between the upper frame and the slotted ends of said brackets and operating in the slots thereof, horizontal springs mounted upon the lower frame, and connecting means between said horizontal springs and the upper frame to sustain the latter and the load thereof.

8. In combination, a lower frame, brackets projected upward therefrom and having their upper portions vertically slotted, an upper movable frame, connecting means between the upper frame and said brackets and operating in the vertical slots thereof, horizontal springs mounted upon the lower frame, levers pivoted between their ends and having connection at their lower ends with said horizontal springs and having their upper ends slotted, and connecting means between the upper ends of said levers and the upper frame.

9. In combination, a lower frame, brackets projected upward therefrom and having their upper ends vertically slotted, an upper frame, horizontal springs mounted upon the lower frame, levers pivoted between their ends to said brackets and having their lower ends connected with the said horizontal springs and their upper ends slotted, and connecting means between the upper frame and the upper ends of said brackets and levers and arranged to operate in the slots thereof.

10. In combination, an axle, a horizontal tube shackled between its ends to said axle, an upper frame, a vertical spring interposed between the inner end of said tube and the upper frame, a horizontal spring arranged within the said tube, and connecting means between the outer end of the tube and spring arranged therein and the upper frame.

11. In combination, an axle, a horizontal tube shackled between its ends to said axle and having an extension at its outer end, an upper frame, a vertical spring interposed between the inner end of said tube and the upper frame, a horizontal spring arranged within the tube, and a lever pivoted between its ends to the extension at the outer end of the said tube and having its lower end connected with the said spring and having its upper end connected with the upper frame.

12 In vehicle running gear, the combination of a horizontal tube having an upwardly projected extension at its outer end and having the upper portion of said extension slotted, an upper frame, connecting means between the upper frame and the slotted portion of said extension, a spring arranged within the tube, a lever pivoted between its ends to the outer extension of the tube and having its lower end connected with the spring within the tube, and connecting means between the upper end of said lever and the upper frame.

13. In vehicle running gear, the combination of a lower frame, an axle, an upper frame, a frame intermediate of the upper and lower frames, connecting means between the intermediate and upper frames to admit of the intermediate frame turning about a vertical and a longitudinal axis, vertical springs located upon one side of the axle and interposed between opposite sides of the intermediate and lower frames, and yieldable connecting means between the opposite sides of said intermediate and lower frames.

In testimony whereof I affix my signature in presence of two witnesses.

JOHN W. COOPER. [L. S.]

Witnesses:
  CHARLES H. COOPER,
  JAMES P. MAGENIS.